United States Patent [19]

Owen et al.

[11] 4,349,634

[45] Sep. 14, 1982

[54] METHOD OF PREPARING PHOTOCHROMIC GLASS

[75] Inventors: Harry Owen, Parbold; Edric Ellis, Ormskirk, both of England

[73] Assignee: Pilkington Brothers Limited, St. Helens, England

[21] Appl. No.: 176,838

[22] Filed: Aug. 11, 1980

[30] Foreign Application Priority Data

Aug. 9, 1979 [GB] United Kingdom ............... 7927751

[51] Int. Cl.$^3$ ..................... C03B 32/00; C03C 3/26; C03C 3/30
[52] U.S. Cl. ..................... 501/13; 65/30.11; 65/32; 501/77
[58] Field of Search ............ 106/52, 54, DIG. 6; 65/30.11, 32; 501/13, 77

[56] References Cited

U.S. PATENT DOCUMENTS

| | | | |
|---|---|---|---|
| 3,022,181 | 2/1962 | Connelly | 65/32 X |
| 3,325,299 | 6/1977 | Araujo | 65/30.11 X |
| 3,892,582 | 7/1975 | Simms | 65/30.11 X |
| 3,920,463 | 11/1975 | Simms | 65/30.11 X |
| 4,017,318 | 4/1977 | Pierson | 501/13 |
| 4,043,781 | 8/1977 | DeMunn et al. | 65/30.11 |
| 4,118,214 | 10/1978 | Wedding | 65/30.11 |
| 4,166,745 | 9/1979 | Araujo et al. | 501/13 |

FOREIGN PATENT DOCUMENTS

| | | |
|---|---|---|
| 2107343 | 10/1971 | Fed. Rep. of Germany . |
| 1367903 | 9/1974 | United Kingdom . |
| 1515642 | 6/1978 | United Kingdom . |

*Primary Examiner*—Richard V. Fisher
*Attorney, Agent, or Firm*—Sughrue, Mion, Zinn, Macpeak & Seas

[57] ABSTRACT

A process for producing a photochromic glass which will exhibit a brown coloration in its darkened state without a degradation in the photochromic properties of the glass taking place. The process includes the steps of forming a batch of specified components which include tin or a tin compound and subjecting the resultant batch to a series of glass-forming steps so as to develop photochromic properties in a glass article formed from the molten batch.

The invention also provides a photochromic glass having silver halide crystals and tin dispersed throughout the glass, the glass having in its darkened state a brown coloration which is described in accordance with the Hunter L,a,b, Color Scale System by the rectangular region having corners defined by the (a,b) co-ordinates: (5,1), (1,5), (12,16) and (16,12), the $\frac{1}{2}$ OD FT of the glass being 120 seconds or less.

15 Claims, No Drawings

METHOD OF PREPARING PHOTOCHROMIC GLASS

FIELD OF THE INVENTION

The present invention relates to photochromic glasses, i.e. to glass compositions which darken on exposure to actinic radiation and fade back to their original, normally virtually colourless, state when they are no longer exposed to such radiation.

DESCRIPTION OF PRIOR ART

In our British Patent Specification No. 1,367,903 (equivalent to U.S. Pat. No. 3,876,436), we have described and claimed a range of photochromic glasses comprising at least 17% by weight $P_2O_5$ as one of the glass forming components, with silver halide crystals dispersed throughout the glass, the total silver content of the glass being at least 0.05% by weight Ag. The specific glasses disclosed in that specification are alumino-phosphate glasses comprising not more than 40% by weight $SiO_2$ and between 9% and 34% by weight $Al_2O_3$ as further glass forming components, and at least 10% by weight $R_2O$, where R=K, Na or Li. They can also contain up to 19% by weight $B_2O_3$, though most of the glasses disclosed contain no more than 3 to 7% $B_2O_3$. Glass compositions of this type which we have made have had a brown colouration in the darkened state. However, although the glass compositions exemplified in the specification of British Pat. No. 1,367,903 exhibit desirable photochromic properties, they have relatively slow responses to exposure and removal of actinic radiation, i.e. they have relatively slow darkening and fading rates.

In our British Patent Specification No. 1515642 (equivalent to U.S. Pat. No. 4,092,174) we have described and claimed a range of photochromic glasses having faster responses, particularly a faster fading rate, than the glass compositions exemplified in our British Patent Specification No. 1,367,903. The glass compositions of British Patent Specification No. 1,515,642 are photochromic alumino-phosphate glasses having silver halide crystals dispersed throughout the glass and comprising, as non-photochromic components in weight percentages:

| | |
|---|---|
| $SiO_2$ | 8.5 to 25% |
| $Al_2O_3$ | 13 to 36.5% |
| $P_2O_5$ | 7.5 to 33.5% |
| $B_2O_3$ | 7 to 28% |
| $R_2O$ | 7 to 20.5% | where $R_2O$ represents one or more of $Na_2O$, $K_2O$ and $Li_2O$, the maximum content of $Li_2O$ being 5%; the amount of $SiO_2$ is not less than 16% when the $B_2O_3$ content is less than 8%; and, as photochromic components, expressed as weight percentages over and above the 100% total of all the non-photochromic components of the glass:

silver, expressed as $Ag_2O$ not less than 0.05%
Cl+Br 0.20 to 2%.

When heat treated to develop optimum photochromic properties as discussed in the above-mentioned patent, these glasses have been found to have a good combination of induced optical density on irradiation with actinic light and rapid darkening on irradiation and rapid fading when irradiation ceases, and to have a grey colouration in their darkened state. These and other presently-available fast response photochromic glasses utilized for ophthalmic and other applications exhibit a grey colouration upon activation with actinic radiation. The colour of these glasses is a function of the composition utilized to produce the photochromic glass, and of the thermal treatment utilized to convert the potentially-photochromic glass as formed into a photochromic article exhibiting the desired sensitivity to actinic light.

Whereas prior art fast response photochromic glasses for ophthalmic and other uses have been widely available in a grey colouration in the darkened state, there is a demand for photochromic glasses of equivalent sensitivity and behaviour, but exhibiting other colourations such as brown.

A number of methods for converting photochromic glasses which exhibit a grey colouration in the darkened state to a glass which exhibits a brown colouration in the darkened state have been proposed. For example, in one method a colourant which is compatible with the photochromic constituents in the glass is added to the base glass. Thus, for example, German Offenlegungschrift No. 2,107,343 describes photochromic glasses containing additions of vanadium, chromium, manganese and cobalt, and the resultant glasses are said to exhibit a variety of colours in combination with photochromic properties.

It has also been suggested to subject photochromic glasses to an "after-treatment" by heating completely developed photochromic glasses in a reducing atmosphere to impart a yellow or brown colouration thereto. Such methods are described in U.S. Pat. Nos. 3,892,582 and 3,920,463.

In a third known method the number and size of silver halide particles in certain specified boro-silicate glass compositions are modified by subjecting the glasses to a two phase-heat treatment procedure. Such a method is described in U.S. Pat. No. 4,043,781.

U.S. Pat. No. 4,043,781 gives an indication of some of the problems presented by the first two above mentioned known methods. In the first method, the addition of a colourant to the base glass leads to a reduction in the level of transmission in the faded state. Furthermore any colour is superimposed on the normal grey appearance of the glass. The method in which an "after-treatment" is used requires a further processing step in the preparation of the glass which can add substantially to the cost of the final glass product. It has also been found that such an "after-treatment" provides predominantly surface colouration. Unless the after-treatment is applied to a finished lens, the colouration of different areas of the lens will vary as the lens blank is ground and polished to form a finished lens.

The method disclosed in U.S. Pat. No. 4,043,781 provides certain advantages over the first two said known methods. For example, no added colourant needs to be used, and the brown colouration is produced throughout the bulk of the glass article. Thus, in the case of the boro-silicate glasses described in U.S. Pat. No. 4,043,781 it is said to be possible to achieve a brown colouration throughout the entire volume of a photochromic glass article by a two stage heat treatment, without any material change in the darkening and fading rates of the glass. In attempting to apply the teaching of U.S. Pat. No. 4,043,781 to the photochromic glasses of British Patent Specification No. 1,515,642, we have found that while modification of the heat treatment schedules can result in a glass which exhibits a brown colour in the darkened stage, such modified heat-treatment also produces deterioration in photochromic properties.

BRIEF SUMMARY OF THE INVENTION

An object of the present invention is to provide a process for producing a photochromic glass which will exhibit a brown colouration in its darkened state without a degradation in the photochromic properties of the glass taking place.

According to a first aspect of the present invention there is provided a process for producing a photochromic glass containing silver halide and which has a brown colouration in its darkened state, which process comprises (a) forming a batch comprising tin or a tin compound in an amount which will produce a glass which will exhibit a brown colouration in its darkened state, together with those glass forming components which, in the absence of tin or the said tin compound and when subjected to steps (b) to (f) below, will produce a photochromic glass having a grey colouration in its darkened state, (b) melting the batch to form a molten glass, (c) refining the molten glass, (d) conditioning the molten glass to bring it into a state suitable for forming into articles, (e) forming the molten glass into articles, and (f) subjecting the formed articles to a heat-treatment which will develop the photochromic properties of the glass, steps (b) to (f) being performed under conditions which, in the absence of tin or the said tin compound, will produce a glass having a grey colouration in its darkened state.

According to a further aspect of the present invention there is provided a photochromic glass having silver halide crystals and tin dispersed throughout the glass, the glass having in its darkened state a brown colouration which is described in accordance with the Hunter L,a,b, Colour Scale System by the rectangular region having corners defined by the (a,b) co-ordinates: (5,1), (1,5), (12,16) and (16,12), the ⅜ OD FT of the glass being 120 seconds or less.

DETAILED DESCRIPTION

The brown colouration which the glass product exhibits in its darkened state can be regulated by the quantity of tin or tin compound added and by adjustment of the melting conditions in steps (b) and (c) and/or of the heat-treatment conditions of step (f).

Steps (b) to (f) are usually performed in conventional manner and using process conditions which are known to produce a photochromic "grey" glass, that is to say a glass which exhibits a grey colouration in the darkened state.

Preferably, the process of the present invention is performed in continuous manner.

In step (a) those components which will produce a photochromic glass having a grey colouration in its darkened state can be, for example, those components used to prepare the photochromic glass compositions described and claimed in our British Patent Specification No. 1,515,642 (The disclosure of this British Patent is incorporated herein by reference). These known fast response glass compositions are photochromic aluminophosphate glasses having silver halide crystals dispersed throughout the glass, the glass comprising as non-photochromic components in weight percentages:

| | |
|---|---|
| $SiO_2$ | 8.5 to 25% |

| -continued | |
|---|---|
| $Al_2O_3$ | 13 to 36.5% |
| $P_2O_5$ | 7.5 to 33.5% |
| $B_2O_3$ | 7 to 28% |
| $R_2O$ | 7 to 20.5% | where $R_2O$ represents one or more of $Na_2O$, $K_2O$ and $Li_2O$, the maximum content of $Li_2O$ being 5%; the amount of $SiO_2$ is not less than 16% when the $B_2O_3$ content is less than 8%; and, as photochromic components, expressed as weight percentages over and above the 100% total of all the non-photochromic components of the glass:

| | |
|---|---|
| silver, expressed as $Ag_2O$ | not less than 0.05% |
| Cl + Br | 0.20 to 2.0% |

Glass compositions of this type may be made up in the following manner: A batch of the glass-forming components is melted and refined under oxidising or neutral conditions at a temperature in the range 1200° C. to 1600° C. The glass is then conditioned, formed into articles, and after cooling is annealed at a temperature between 450° C. and 650° C. A final heat-treatment which has the effect of developing the photochromic properties of the glass may subsequently be effected at between 20° and 100° C. above the annealing point for a period of 10 to 60 minutes. The optimum heat-treatment temperature range for a particular glass may be determined by a gradient furnace technique. In some cases, it may be necessary to support the glass during heat-treatment to avoid sagging. The batches for making the glass can be made up from conventional glass-making raw materials, such as carbonates, meta- or ortho phosphates, nitrates and oxides. The silver and halide components may be added to the batches in the form of finely-ground silver salts and sodium or potassium halides, respectively.

Precautions are required during melting to minimise volatilisation losses of batch components. Up to 60% by weight of the halide components and 30% by weight of silver may be lost in this way and the necessary allowances are required during batch preparation.

As has been stated, the photochromic effect of the glass compositions of our British Pat. No. 1,515,642 can be developed by heat-treatment of the glass, the appropriate heat-treatment schedule being primarily determined by the viscosity-temperature relationship of the particular glass. In general, the heat-treatment temperature lies between the strain point and the softening point of the glass, the heat-treatment time required being several hours at the lower temperature but only a few minutes at the higher temperature. At the higher temperature, however, deformation and clouding of the glass may occur, so it is preferred for convenience to use a temperature 20° to 100° C. above the annealing point and a heat-treatment time of 10 to 60 minutes. The schedule may be imposed on the glass directly after forming or the glass may be annealed and cooled to room temperature before heat-treatment. The cooling rate to which the glass is subjected after heat-treatment is sometimes found to have an effect on the photochromic properties of the final product. This cannot be stated as a general rule, however, and must be determined by experimentation on individual glasses. The temperature/time schedule imposed on a glass is also determined by the concentrations of photochromic agents in the glass and the photochromic property requirements of the final product. In general, the higher the levels of the components contributing to the photochromism the shorter will be the heat-treatment schedule, and in some cases, the photochromism may develop during cooling from the melt or annealing of the glass. Excessively long heat treatments are generally to be avoided because they will lead to some clouding of the glass. These comments on the subsequent heat-treatment of the glasses of British Pat. No. 1,515,642 are equally applicable to the heat-treatment of step (f) of the present process.

We have found that if one subjects a fast response photochromic glass of the type described and claimed in our British Patent Specification No. 1,515,642 to a two-stage heat-treatment of the type described in U.S. Pat. No. 4,043,781, one can obtain a glass having a brown colouration in its darkened state. However this two-stage heat treatment has the unfortunate effect of also producing a deterioration in the photochromic properties of the glass.

In contrast, in accordance with the process of the present invention, by adding a small proportion of tin or a tin compound to a batch comprising the components of the above-mentioned fast-response photochromic glass compositions, one can obtain a photochromic glass which has a brown colouration in its darkened state without any accompanying degradation of the photochromic properties of the glass. In addition, having selected a preferred brown colouration for the glass in its darkened state, one can, if desired, control the amount of tin or tin compound added to the batch and regulate the process conditions so as to obtain, as the product of the process, a fast response photochromic glass having the selected brown colouration in its darkened state.

It is believed that, under the melting conditions in a glass melting tank, tin or any tin compound added will generate a proportion of tin in a reduced ionic state in the glass. It is further believed that this reduced form of tin acts as a reducing agent which enables the brown colouration in the darkened state of the glass to be obtained.

It has previously been considered that it is usually detrimental to have reducing agents or reducing conditions present during the formation of a photochromic glass. The reason for this is that in some circumstances the silver halides present in the glass can be reduced to metallic silver giving either silver balls in the finished glass or a silver ruby glass with no or poor photochromic properties. This is still so, but we have found that by adding a controlled amount of tin or a tin compound it is possible to obtain the advantageous formation of a photochromic glass which assumes a brown colouration in its darkened state without adversely affecting the photochromic properties of the glass. It is commercially desirable to have both brown and grey glasses available and the process of the present invention enables one to move easily from one of said colours to the other during a production campaign by adding or ceasing to add tin or a tin compound to the batch of glass-forming components.

Tin or any tin-containing compound which will generate, under the conditions of the present process, tin in a reduced ionic state in the glass can be used in the process of the present invention. It is preferred that the tin compound is one which is physically compatible with the batch, that is to say that it is a solid, which is preferably in finely divided form. Furthermore the tin compound is preferably a non-toxic material, is "stable" in the sense that it gives no losses or insignificant losses of tin during melting of the batch, and is a material which does not affect the chemical properties of the resultant glass product. Desirably the tin compound is one which is readily available and is of low cost. If a relatively volatile tin compound is used, the amount of tin compound used must be such as to compensate for the losses of compound which result from volatilisation.

If it is desired to add metallic tin to the batch, the tin must be in a form which is such that silver spheres and other inclusions will not be formed in the molten glass.

Stannous oxide and stannic oxide are examples of preferred tin compounds for use in the present invention.

The quantity of tin or tin compound to be included in the batch of glass-forming components can be easily determined by a man practised in the art. It will be dependant to some extent on the throughput, i.e. the time at which the glass is held at a particular temperature, and on the melting and heat treatment conditions being used with a particular glass composition.

Preferably the amount of tin or tin compound added is such as to produce a finished glass which in its darkened state has a brown colouration which is described in accordance with the Hunter L,a,b Colour Scale system (see "Measurement of Appearance" by R. S. Hunter, pages 122 and 123) by the rectangular region on the a,b-plane of the Hunter system with corners on the (a,b) coordinates: (5,1), (1,5), (12,16) and (16,12). By way of comparison, the grey colouration of glasses discussed in this specification is usually a colour which can be described by an area on the a,b-plane of the Hunter L,a,b system which is a quadrilateral having corners at the (a,b)-coordinates: (3.5,2), (7,−5.5), (−3.5,−5.5), and (−3.5,2). Glasses having a colour in this area can be said to be substantially grey in appearance.

The above specific colours are defined with reference to the C.I.E. illuminant C (see page 50 of "Measurement of Appearance" by R. S. Hunter).

The effect of increasing the level of tin or tin compound in the glass batch without any other change in conditions is to make the glass assume a more intense brown colouration in its darkened state, i.e. the values (a,b) in the Hunter L,a,b, co-ordinate system increase. If desired, the glass can be made less brown in colour again by reducing the quantity of tin or tin compound. It is not usual when operating a glass melting process to alter the throughput of glass once this has been fixed, but any change in throughput will change the time the molten glass has been kept at particular temperatures. Accordingly, should a change in throughput occur, a change in tin or tin compound level will be needed.

In giving guidance as regards appropriate levels of tin or tin compound to add to the batch, it is impossible to state that a particular quantity should be used with a particular glass batch, as there must be correlation with melting temperature, throughput, heat-treatment conditions and annealing schedules. Thus in general we find that having set a target colour based on the Hunter L,a,b, system, a quantity of tin or tin compound is added to the batch of glass-forming components, and the variance from target colour of the resultant glass is determined. Thereafter, the amount of tin or tin compound and/or process conditions are adjusted as necessary until the finished glass will give the desired target colour. These changes or the initial addition of tin or tin compound will only cause a deterioration in photochromic properties if the quantity of tin or tin compound is excessive and causes the transformation of a large proportion of the silver present to elemental silver either giving a silver ruby or small discrete silver spheres.

In general, we have found that an amount of tin or tin compound which will produce 500 to 5000 ppm, preferably 500 to 3500 ppm of tin, expressed as $SnO_2$, in the finished glass is suitable.

Some fine adjustment of the colour exhibited by the glass in its darkened condition may be achieved by altering the conditions under which the glass is heat-treated and annealed.

In some cases it may be found desirable to add reducing agents, such as for example starch or potassium hydrogen tartrate, to the glass batch so as to increase the proportion of tin in the reduced ionic state relative to the amount of tin in a non-reduced or less reduced ionic state. When such additional reducing agents are added, it is important to ensure that the amount and form of such agents is not such as to cause elemental silver in the shape of small spheres to separate in the melt.

We do not know the exact reason for our success in obtaining a photochromic glass having a brown colouration in its darkened condition without any falling off in photochromic response when compared to a photochromic glass of a similar composition which has a grey colouration in its darkened state. One theory is that a very small proportion of the tin is in a particular ionic state which enables it to convert a very small proportion of dissolved silver ions into a silver precipitate. This precipitate is so fine and well distributed that its individual particles act as nucleating agents on which the silver halide crystals grow, thus giving a proportion of free silver in the silver halide particles. This in turn could alter the sites on which silver is produced photochemically during darkening giving a different darkened colour. Thus we believe a reduced ionic state of tin is having an effect during heat-treatment rather than during the melting process.

The process of the present invention can also be used with batches of glass-forming components which include a colouring agent which produces a tint such as, for example, amber in the glass when in its faded condition.

In a preferred embodiment of the process of the present invention, in order to produce in a continuous process glass having a satisfactory colour in its darkened condition, one first produces a glass of a composition which will produce the desired photochromic properties. Once the glass batch has been adjusted to suit the particular melting conditions and a suitable heat-treatment schedule has been established, i.e. so that for example the photochromic glass which is produced is one having 16% transmission in its darkened state and 88% transmission in its clear state with a ½ OD FT of 45 seconds, tin or a tin compound is added to the batch at a level such as to give for example 5000 ppm tin, expressed as $SnO_2$, in the finished glass. The colour of the finished glass in the darkened condition is measured and then the level of tin or tin compound in the batch can be raised or lowered to obtain a glass having a desired brown colouration in its darkened condition, for example brown colour in the region defined by coordinates (5,1), (1,5), (12,16) and (16,12) in the Hunter L,a,b, Colour Scale system. We have found that it is generally possible to obtain a given brown colouration with a range of levels of tin in the finished glass. Thus, for example, in cases where a particular brown colouration can be obtained with levels of 3000 ppm of tin, expressed as $SnO_2$, in the finished glass, it may be possible to obtain the same brown colouration when the quantity of tin is reduced to a level of the order of 900 to 1000 ppm in the finished glass. This may be due to the possibility that under steady conditions no matter how much tin or tin compound is added, the quantity of tin in a reduced ionic state which is "active" to produce the brown colour is of the same order.

According to a further aspect of the present invention there is provided a photochromic glass having silver halide crystals and tin dispersed throughout the glass, the glass having in its darkened state a brown colouration which is described in accordance with the Hunter L,a,b, Colour Scale system by the rectangular region having corners defined by the (a,b) co-ordinates: (5,1), (1,5), (12,16) and (16,12), the ½ OD FT of the glass being 120 seconds or less.

Preferred such glasses have a composition as claimed in our British Patent Specification No. 1,515,642 and include tin in the finished glass composition.

Preferably the amount of tin in the finished glass, expressed as $SnO_2$, is 500 to 5000 ppm, more preferably 500 to 3500 ppm.

In this specification the property of a glass composition referred to as ½ OD FT is the time in seconds taken to fade to a condition of half the total induced optical density, measured with standard samples of glass 2 mm thick at 25° C., in standard simulated solar conditions at air mass 2 (see Parry Moon, J. Franklin Inst., 230 (1940), pages 583–617). The induced optical density is the difference between the optical density of the glass in the fully darkened state and the optical density in the fully faded state, the optical density being defined in the conventional manner as $$\log 10(I_i/I_t),$$

where $I_i$ is the intensity of the incident light and $I_t$ is the intensity of the transmitted light. The induced optical density is thus a real measure of the photochromic effect and is in fact directly proportional to the number of photochromically activated silver atoms in a given volume of the glass. The time required to fade from the fully darkened condition to a condition of half the induced optical density (½ OD FT) is thus an effective measure for comparing fading times of glasses having different values of light transmission in the bleached or faded state.

The fully darkened state of the glass compositions of the present invention is defined as the state reached by a standard sample of photochromic glass 2 mm thick at 25° C. after exposure to the above-mentioned standard simulated solar conditions at air mass 2 for 23 minutes.

The following Examples illustrate the present invention.

EXAMPLES

Two glasses (compositions I and II) having compositions closely similar in all respects except that composition I included no tin, while composition II included a small proportion of added $SnO_2$, were prepared by melting a batch of appropriate glass-forming components at the temperatures and times shown in Table I. The glass compositions were then processed in accordance with the conditions given in Table I, and the colour and photochromic properties of flat polished samples 2 mm thick made from the resultant compositions were measured.

For each of compositions I and II the base glass composition on the oxide basis in weight percentages was:

| | |
|---|---|
| $P_2O_5$ | 15.2 |
| $Al_2O_3$ | 27.6 |
| $SiO_2$ | 17.7 |
| CaO | 2.9 |
| BaO | 9.0 |
| $TiO_2$ | 0.5 |
| $ZrO_2$ | 0.8 |
| $K_2O$ | 10.9 |
| $Li_2O$ | 1.5 |
| $B_2O_3$ | 13.9 |
| $Co_3O_4$ | 16 ppm. |

In addition, glass composition II includes 1400 ppm of tin, expressed as $SnO_2$ in the finished glass.

From the data given in Table I, it will be seen that glass composition II has a brown colouration in its darkened state as manifest by Hunter a,b-co-ordinates (3.9, 3.1), while glass composition I, which has no tin, has a grey colouration in its darkened state as manifest by Hunter a,b-co-ordinates (2.8−2.1).

From a consideration of the transmission of glass compositions I and II in their darkened and faded conditions and their $D_x, F_x$ values (see Table I) it will be seen that the presence of tin in the glass has not adversely affected the photochromic properties of the glass.

Examples of some further glass compositions in accordance with the invention are given in Table II. The base glass composition of these glasses was very similar to that of the base glass composition of Glass II. These glasses show a more intense brown colouration in their darkened state than glass composition II, and yet retain desirable fast responses to exposure to and removal from actinic radiation as is manifest by the $D_x, F_x$ and ½ OD FT values set out in Table II.

Glasses III, IV and V contained respective amounts of tin (analysed as $SnO_2$) of 2,100 ppm, 3,000 ppm and 890 ppm in the finished glass.

TABLE I

| Glass Composition | I (Comparative) ("Grey Glass") | II ("Brown Glass") |
|---|---|---|
| Photochromic components[7] | | |
| $Ag_2O$ | 0.396 | 0.320 |
| CuO | 0.041 | 0.036 |
| Cl | 0.60 | 0.35 |
| Br | 0.14 | 0.30 |
| Process conditions | | |
| Melting Temperature/Time | 1300° C./3 hr | 1350° C./3 hr |
| Refining Temperature/Time | 1400° C./2 hr | 1400° C./2 hr |
| Heat-treatment of Step (f)/Time | 655° C./16 min | 655° C./16 min |
| Optical Properties | | |
| % Transmission in Faded State | 87% | 87% |
| % Transmission in Darkened State | 19.3% | 24.1% |
| Colour in Faded State[2] | (−1.5, 2.9) | (−2.3, 4.2) |
| Colour in Darkened State[2] | (2.8, −2.1) | (3.9, 3.1) |
| $D_{x=83}$ | 43.3% | 52.3% |
| $D_{x=603}$ | 74.5% | 79.3% |
| $F_{x=163}$ | 33.9% | 48.1% |
| $F_{x=6003}$ | 87.5% | 93.4% |
| ½ OD FT | approx 45 secs | 20-25 secs. |

TABLE II

| Glass Composition | III | IV | V |
|---|---|---|---|
| Photochromic components[7] | | | |
| $Ag_2O$ | 0.362 | 0.33 | 0.37 |
| CuO | 0.30 | 0.30 | 0.38 |
| Cl | 0.23 | 0.25 | 0.16 |
| Br | 0.027 | 0.027 | 0.026 |
| Process conditions | | | |
| Melting Temperature | 1260° C. | 1300° C. | 1340° C. |
| Refining Temperature | 1390° C. | 1450° C. | 1500° C. |
| Heat-treatment of step (f) | 627° C. | 655° C. | 677° C. |
| Optical Properties | | | |
| % Transmission in Faded State | 88.6% | 84.1% | 87.1% |
| % Transmission in Darkened State | 25.5% | 14.4% | 15.7% |
| Colour in Faded State[2] | (−4.3, 7.5) | (−2.8, 7.7) | (−2.3, 4.5) |
| Colour in Darkened State[2] | (5.6, 4.3) | (7.6, 7.6) | (7.2, 6.4) |
| $D_{x=83}$ | 40.9% | 38.4% | 42.1% |
| $D_{x=603}$ | 85.8% | 73.5% | 75% |
| $F_{x=163}$ | 47.2% | 34.4% | 31% |
| $F_{x=6003}$ | 86.4% | 86.7% | 88.4% |
| ½ OD FT | approx 25 secs | approx 45 secs | approx 50 secs. |

Key to Tables I and II

1. Measured as weight percentages over and above the 100% total of all the non-photochromic components of the glass (i.e. the base glass)
2. Colour expressed as (a,b) co-ordinates in the a,b-plane of the Hunter L,a,b, Colour Scale System. Colour measured by standard techniques.
3. $D_x$ and $F_x$ represent the percentage of the total change in optical density which occurs after darkening (D) or fading (F) for a time of x seconds.

We claim:

1. A process for producing a photochromic glass containing silver halide and which has a brown colouration in its darkened state, which process comprises (a) forming a batch comprising tin or a tin compound in an amount which will produce a glass which will exhibit a brown colouration in its darkened state, together with those glass forming components which, in the absence of tin or the said tin compound and when subjected to steps (b) to (f) below, will produce a photochromic glass having a grey colouration in its darkened state, (b) melting the batch to form a molten glass, (c) refining the molten glass, (d) conditioning the molten glass to bring it into a state suitable for forming into articles, (e) forming the molten glass into articles, and (f) subjecting the formed articles to a heat-treatment which will develop the photochromic properties of the glass, steps (b) to (f) being performed under conditions which, in the absence of tin or the said tin compound, will produce a glass having a grey colouration in its darkened state.

2. A process according to claim 1, wherein the process is performed in continuous manner.

3. A process according to claim 1, wherein the components used in step (a) are components which, in the absence of tin or the said tin compound, will produce a fast response photochromic alumino-phosphate glass having silver halide crystals dispersed throughout the glass and having a grey colouration in its darkened state, the glass comprising as non-photochromic components in weight percentages:

| | |
|---|---|
| $SiO_2$ | 8.5 to 25% |
| $Al_2O_3$ | 13 to 36.5% |
| $P_2O_5$ | 7.5 to 33.5% |

-continued

| | |
|---|---|
| $B_2O_3$ | 7 to 28% |
| $R_2O$ | 7 to 20.5% | where $R_2O$ represents one or more of $Na_2O$, $K_2O$ and $Li_2O$, the maximum content of $Li_2O$ being 5%; the amount of $SiO_2$ being not less than 16% when the $B_2O_3$ content is less than 8% and, as photochromic components, expressed as weight percentages over and above the 100% total of all the non-photochromic components of the glass:

| | |
|---|---|
| silver, expressed as $Ag_2O$ | not less than 0.05% |
| Cl + Br | 0.20 to 2.0%. |

4. A process according to claim 1, 2 or 3, wherein the tin compound is stannous oxide or stannic oxide.

5. A process according to claim 1, 2 or 3, wherein the tin compound is in the form of a finely divided solid.

6. A process according to claim 1, 2 or 3, wherein the amount of tin or tin compound added is such as to produce a finished glass which in its darkened state has a brown colouration which is described in accordance with the Hunter L, a,b Colour Scale system by the rectangular region on the a,b-plane of the Hunter system with corners on the (a,b) co-ordinates: (5,1), (1,5), (12,16) and (16,12).

7. A process according to claim 1, wherein the amount of tin or tin compound used is an amount which will produce 500 to 5000 ppm, expressed as $SnO_2$, in the finished glass.

8. A process according to claim 7, wherein the amount of tin or tin compound used is an amount which will produce 500 to 3500 ppm, expressed as $SnO_2$, in the finished glass.

9. A process according to claim 1, wherein the batch of components in step (a) includes one or more reducing agents.

10. A process according to claim 9, wherein the reducing agent is starch or potassium hydrogen tartrate.

11. A process according to claim 1, wherein the batch of glass-forming components in step (a) includes a colouring agent which produces a tint in the glass when the glass is in its faded condition.

12. A process according to claim 11, wherein the tint is amber.

13. A photochromic glass having silver halide crystals and tin dispersed throughout the glass, the glass having in its darkened state a brown colouration which is described in accordance with the Hunter L,a,b Colour Scale System by the rectangular region having corners defined by the (a,b) co-ordinates: (5,1), (1,5), (12,16) and (16,12), the ½ OD FT of the glass being 120 seconds or less, the glass being an alumino-phosphate glass having silver halide crystals dispersed throughout the glass and comprising, as non-photochromic components in weight percentages:

| | |
|---|---|
| $SiO_2$ | 8.5 to 25% |
| $Al_2O_3$ | 13 to 36.5% |
| $P_2O_5$ | 7.5 to 33.5% |
| $B_2O_3$ | 7 to 28% |
| $R_2O$ | 7 to 20.5% | where $R_2O$ represents one or more of $Na_2O$, $K_2O$ and $Li_2O$, the maximum content of $Li_2O$ being 5%; the amount of $SiO_2$ being not less than 16% when the $B_2O_3$ content is less than 8%; and, as photochromic components, expressed as weight percentages over and above the 100% total of all the nonphotochromic components of the glass:

| | |
|---|---|
| silver expressed as $Ag_2O$ | not less than 0.05% |
| Cl + Br | 0.20 to 2%, | the finished glass composition further including tin.

14. A photochromic glass according to claim 13, wherein the amount of tin in the finished glass, expressed as $SnO_2$, is 500 to 5000 ppm.

15. A photochromic glass according to claim 14, wherein the amount of tin in the finished glass, expressed as $SnO_2$, is 500 to 3500 ppm.

* * * * *